United States Patent [19]

Huffman et al.

[11] Patent Number: 4,793,309
[45] Date of Patent: Dec. 27, 1988

[54] ENGINE GOVERNOR EDDY-CURRENT DAMPER MECHANISM AND METHOD

[75] Inventors: Paul F. Huffman, Ham Lake, Minn.; Ron L. Bardell, Mountain View, Calif.

[73] Assignee: Onan Corporation, Minneapolis, Minn.

[21] Appl. No.: 91,269

[22] Filed: Aug. 31, 1987

[51] Int. Cl.⁴ .............................................. F02D 9/10
[52] U.S. Cl. ................... 123/376; 123/319; 123/396
[58] Field of Search ............... 123/319, 372, 373, 376, 123/396, 400, 401

[56] References Cited

U.S. PATENT DOCUMENTS

| | | |
|---|---|---|
| 1,265,883 | 5/1918 | Church .............................. 123/376 |
| 2,367,606 | 1/1945 | Olson ................................ 123/376 |
| 2,533,180 | 12/1950 | Rhodes . |
| 2,613,657 | 10/1952 | Sloane et al. . |
| 2,635,596 | 4/1953 | Adler . |
| 2,688,456 | 9/1954 | Jensen . |
| 2,708,737 | 5/1955 | Skidmore . |
| 2,716,397 | 8/1955 | Heinish . |
| 3,276,439 | 10/1966 | Reinchenbach . |
| 4,176,642 | 12/1979 | Shipinski ......................... 123/373 X |
| 4,355,611 | 10/1982 | Hasegawa ......................... 123/396 |
| 4,530,334 | 7/1985 | Pagdin ............................. 123/494 |

FOREIGN PATENT DOCUMENTS

| | | | |
|---|---|---|---|
| 2528113 | 12/1983 | France ............................. 123/319 |
| 200047 | 11/1983 | Japan .............................. 123/361 |
| 128936 | 7/1984 | Japan .............................. 123/376 |

Primary Examiner—Tony M. Argenbright
Attorney, Agent, or Firm—Gould, Smith, Edell, Welter & Schmidt Merchant

[57] ABSTRACT

A method of damping governor over compensation and searching is an engine/generator set comprises the provision of an eddy current damper in association with a governor member of the system. The preferred eddy current damper comprises a governor arm having an eddy current plate on one end thereof, the plate being oriented to move through a magnetic field generated by an industrial magnet mounted on the engine/generator set. As the governor arm moves in response to changes in engine speed the eddy current plate is passed through the magnetic field, the generated eddy current causing resistance to motion and a damping effect. Through a conventional linkage mechanism, the damping effect is translated to control of the engine throttle. As a result, over-compensation is generally reduced and/or searching is inhibited.

13 Claims, 2 Drawing Sheets

1/4 Rated Load
PRIOR ART

1/2 Rated Load
PRIOR ART

ENGINE GOVERNOR EDDY-CURRENT DAMPER MECHANISM AND METHOD

TECHNICAL FIELD

The present invention relates to engines, in particular engines for use in power generator sets. More specifically, the invention concerns governor systems for such engines, and the provision of a damper mechanism to generally limit governor over-compensation and inhibit searching.

BACKGROUND OF THE INVENTION

Conventional generator sets have found a wide variety of uses. Typically, a generator set comprises an engine in association with a generator or generator mechanism, used to provide electrical power. Such systems are used, for example, to provide emergency power in homes and offices. Portable units are used to provide electrical power at work stations in the field and for recreational vehicles and the like.

Generally, the engine is spark-ignited, utilizing gasoline, natural gas, propane, diesel, or similar fuel. The engine is typically set to run at a preferred speed, usually defined in terms of the revolutions per minute (rpm) of the engine driveshaft. This speed is ordinarily determined by the rate at which the engaged generator must be driven, to efficiently produce power during a typical load.

During use, the load on the engine may vary considerably. This may occur as power drain on the generator is varied. For example, a load variation will occur as a power tool or appliance is turned on or off.

If a heavier load is placed on the engine, the engine will tend to slow down. The engine governor system or mechanism provides for a continual adjustment in engine speed in response to the load variations, to maintain a relatively constant engine speed. Generally this is accomplished through an adjustment of a throttle, to adjust air or fuel flow from or through the carburetor. In many systems the throttle is adjusted by means of a butterfly valve or throttle plate. Should a greater load be placed on the engine, the throttle is adjusted somewhat in response to the concomitant decrease in rpm, allowing the engine to speed up. On the other hand, should a load suddenly be taken off an engine, the throttle is adjusted in an opposite manner, in response to the rpm surge, to slow the engine down.

The typical governor system comprises a sensor mechanism which detects, either directly or indirectly, the rotation speed of the engine driveshaft or crank shaft. Through conventional governor linkage mechanisms including a governor member(s), the sensor typically communicates with a throttle control. A typical governor linkage mechanism includes a governor arm, as a governor member. The governor arm is linked to another governor member, a governor rod, which provides mechanical communication with the throttle control. In many conventional systems this occurs through mechanical connection to a pivotable rod on which a throttle plate is mounted. Rotation of the pivotable rod selectively orients the throttle plate to increase or decrease engine speed.

Such systems are well-known and will not be described in detail herein. However, generally, should the engine speed change, the governor sensor, in response to the change in engine speed, moves the governor member(s). Movement of the governor member(s) typically causes controlled and a predicted movement of the throttle control to adjust the engine seed back toward a desired norm.

Since the very earliest developments of governor systems, there have been problems of hunting or searching and over-compensation. That is, while attempting to return the engine speed to the normal, desired, speed, the governor usually over-compensates. As a result, the engine may speed up and slow down a number of times, before it finds the correct speed. This is typically referred to as "hunting" or "searching".

Searching is a problem, since it may lead to undesired power fluctuations and inefficient utilization of fuel. In the past, attempts to control hunting or searching have generally involved efforts to reduce to a minimum the amount of mechanical friction in the governor linkage mechanism. This has generally led to an improvement in governor operation, partially due to a limitation in the amount that any given movable mechanical joint can unpredictably "stick". However, even reduced friction systems still undergo a substantial amount of undesired searching or hunting.

What has been needed has been a system and method for the reduction and/or control of undesired over-compensation leading to hunting or searching.

OBJECTS OF THE INVENTION

Therefore, the objects of the invention are: to provide a method of damping engine governor searching through introduction of an eddy-current damper mechanism into a governor control; to provide such a method particularly suited for use with an engine/generator set; to provide such an eddy-current damper mechanism which utilizes a governor member having an eddy-plate thereon, the eddy-plate being aligned to pass through a magnetic field during governor member operation; to provide such a mechanism wherein the governor member comprises a governor arm linked to a mechanism which selectively actuates pivoting of a throttle plate to modify engine speed; to provide a preferred such eddy-current damper which utilizes a magnet of about 7,000–9,000 gauss; to provide such a damper mechanism which is relatively inexpensive to produce and assemble, easy to manufacture, simple to use, and which is particularly well adapted for the proposed usages thereof. Further, it is an object of the present invention to provide such a system which can be readily utilized in association with a variety of conventional engine/generator sets. That is, after modifications made according to the present invention, conventional governor systems may be effectively dampened.

Other objects and advantages of this invention will become apparent from the following descriptions, taken in connection with the accompanying drawings, wherein are set forth by way of illustration and example certain embodiments of the present invention.

SUMMARY OF THE INVENTION

The present invention comprises the placement of an eddy-current damper in a governor system, to partially resist adjustment of the governor system to open or close the throttle on an associated engine. In general, a governor member, typically a governor arm, of the governor system is provided with an extension or plate portion oriented to move through a magnetic field, as the governor system is operated. The materials are chosen such that resistance to movement of the governor arm is provided by the magnetic field, due to creation of an eddy-current in the extension. The resulting resistance to governor movement inhibits operation of the governor in causing, through a link mechanism reorientation of the engine throttle. As a result, throttle adjustment is dampened somewhat, reducing undesired hunting or searching of the engine governor system for the appropriate engine speed. The system is effective, in part, because the total amount of resistance to throttle adjustment is selectable and reproducible.

The preferred arrangement according to the present invention generally utilizes a pivotally mounted governor arm, with an eddy-current plate on one end thereof. A magnet is provided mounted on one portion of the associated engine/generator set, oriented for movement of the governor arm eddy plate longitudinally through the magnetic field as the governor system responds to changes in engine speed. The preferred mechanism also includes a governor rod, linked to the governor arm. The governor rod provides for communication with a throttle control, typically a linkage assembly operating the throttle.

In operation, when the engine speed increases or decreases, the governor arm is be pivoted in response to the governor system sensor mechanism. Resistance to rapid and over-compensating governor arm or member movement is provided by the magnetic field, setting up an eddy-current in the governor arm eddy plate. As a result of the eddy-current damper system, movement of the overall governor linkage mechanism is inhibited. This will be understood, from the detailed description, to result in limitation of over-compensation and the damping of hunting or searching.

The drawings constitute a part of this specification and include exemplary embodiments o the present invention, while illustrating various objects and features thereof. I some instances, relative material thicknesses, and component sizes, may be shown exaggerated to facilitate an understanding of the invention.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention is virtually any appropriately detailed structure.

Figure 1:
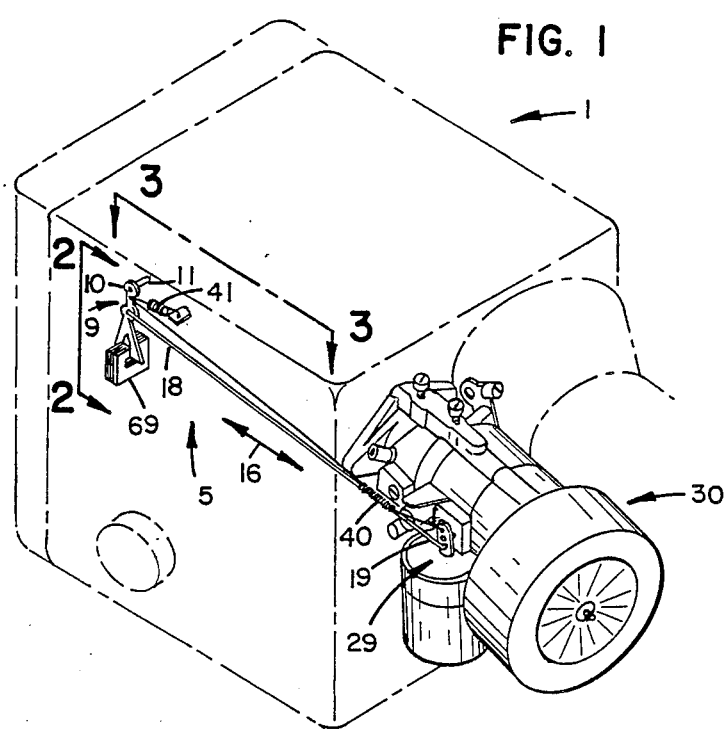
FIG. 1 is a fragmentary, perspective view of an engine/generator set or system modified to include an eddy-current damper according to the present invention; many of the components of the engine/generator set being shown in phantom lines.

The reference numeral 1, FIG. 1, generally designates an engine/generator set modified according to the present invention to include an eddy-current damper mechanism thereon. The engine/generator set 1 may be of any conventional type, which generally includes an internal combustion engine, i.e., a spark-ignited engine utilizing gasoline, liquid propane, natural gas, diesel oil, or similar fuels for operation. The invention may be used on other governor controlled engines subject to load variations, but is is particularly well-suited to engine/generator applications.

The engine/generator set 1 includes a conventional electric generator, powered by the internal combustion engine to provide electrical power for the operation of various electric devices. For example, the engine/generator set 1 may be a portable unit utilized with recreational vehicles, or used in the field to operate lights or tools such as carpentry equipment or the like. On the other hand, the engine/governor set 1 may comprise an emergency back-up power system for a home or office. It will be understood that a variety of manufactures and sizes of engine/governor sets 1 may be utilized in conjunction with the principles of the present invention.

Engine/generator set 1 includes a governor mechanism or system 5. Except as modified to inhibit searching and over-compensation, the governor mechanism 5 may be of a conventional design. For example, governor mechanism 5 includes a governor sensor mechanism, not detailed, mounted in association with a crankshaft or driveshaft of the engine. A conventional sensor, for example a flyball sensor, may be used. The details of such a system are not provided herein, as they are well-known in the art and do not generally limit application of the invention.

Typically, a conventional governor sensor is utilized to detect changes in the engine speed, i.e., changes in the rpm of the driveshaft or crankshaft. In response to these changes, the governor sensor causes a predicted movement of a governor linkage mechanism 9. A main component of mechanism is a governor member or arm 10, FIG. 1.

Figure 4:
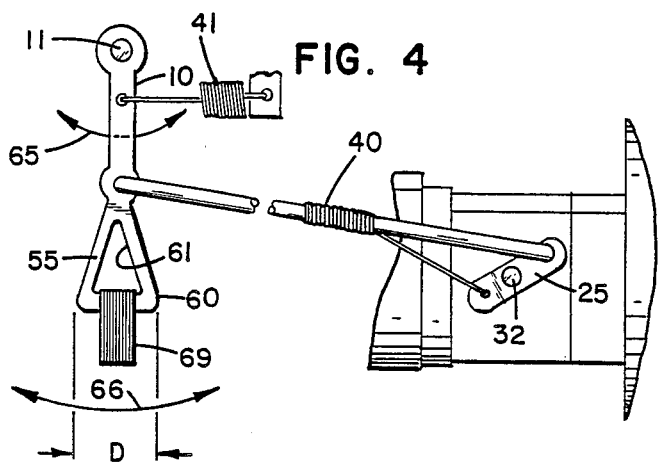
FIG. 4 is an enlarged, fragmentary, side elevational view of a portion of the system shown in FIGS. 1 and 3; taken generally from the perspection of line 4—4, FIG. 3.

Referring to FIG. 4, governor arm 10 of the preferred embodiment is pivoted about the axis defined by axle 11 in response to changes in engine speed detected by the governor sensor. In FIG. 1, the governor arm 10 is shown mounted on a side of the engine/generator set 1, to pivot about a substantially horizontal axis defined by axle 11. A variety of alternative arrangements, it will be understood, can be utilized in association with the principles of the present invention.

For the preferred embodiment, the mechanism 9 includes a governor rod 15, linked to arm 10, which moves in response to pivoting of arm 10, generally in the directions indicated by double-headed arrows 16.

Figure 3:
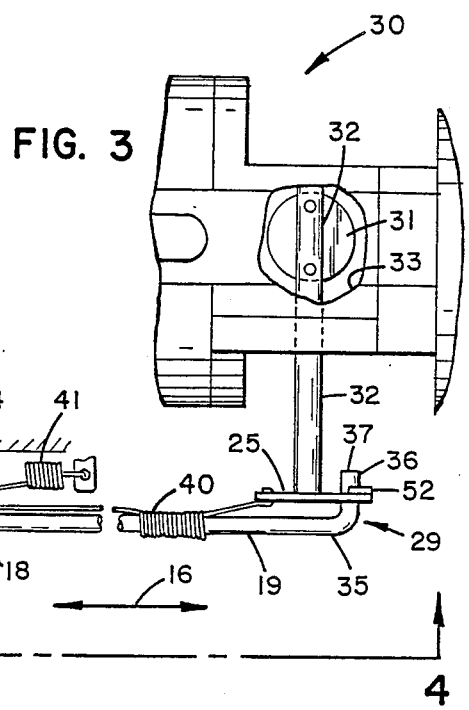
FIG. 3 is an enlarged, fragmentary top plan view of a portion of the system shown in FIG. 1, taken from the point of view of line 3—3.

Referring to FIGS. 1 and 3, generally governor rod 15 includes first and second end portions 18 and 19. End portion 18 is pivotally linked to governor arm 10 by hook 24. End portion 19 is pivotally linked to a crank arm 25 mounted at a throttle control 29 at or near carburetor assembly 30.

Referring to FIG. 3, the throttle control 29 includes a throttle plate 31. Throttle plate 31, of the preferred embodiment, is mounted upon a rotation axle 32. As axle 32 is rotated or pivoted, the position of throttle plate 31 is adjusted to open or close passageway 33. Generally, passageway 33 provides for the entrance of air and/or fuel into the engine. As passageway 33 is opened or closed, engine speed is predictably modified. Generally, the governor system 5 controls the orientation of throttle plate 31, in response to engine speed, to increase or decrease the engine speed to a selected, desired, level.

Referring to FIGS. 3 and 4, crank arm 25 is mounted on axle 32 and is engaged by end portion 19 of rod 18. In particular, end portion 19 includes a bend 35 defining a projection 36 and a tip 37. The tip 37 extends through an aperture in crank arm 25, to provide a pivotable linkage. Pin 52 provides retention of the linkage in a connection manner. As rod 18 moves in the general direction of double-headed arrow 16, crank arm 25 is pivoted to rotate axle 32. Pivoting of axle 32 rotates throttle plate 31 to speed up or slow down, selectively, the engine speed. It is noted that crank arm 25 need not be directly mounted on the axle to which the throttle plate is attached. In some systems further mechanical linkages may be used.

In a typical operation, an engine portion of an engine/generator assembly 1 is set to operate at or near a selected preferred speed, typically defined by the desired rpm for the driveshaft. If a substantial load is placed on the generator, for example through the drawing of power by means of operation of an electrical appliance or the like, the power drain on the generator will cause the engine to decelerate, i.e. to slow somewhat. The slowing of the engine speed is detected by the governor sensor mechanism, not detailed. This causes a selected and calculated movement of the governor member 10. The result is a movement of the governor linkage mechanism, i.e. governor rod 18, and a calculated adjustment in the throttle, for the preferred embodiment through pivoting of the throttle plate axle 32, causing the engine speed to increase. This returns the engine speed toward the desired level. Lost motion or governor assist spring 40 operates to retain governor rod 18 at a desired physical position. Engine damage from operation of the governor sensor, typically a flyball sensor, to open the system up to full throttle is controlled by main governor spring 41.

Figure 5:
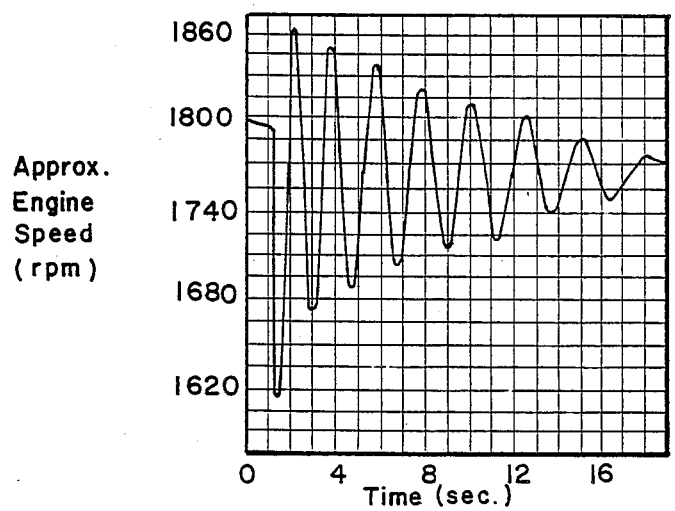
FIG. 5 is a strip chart illustrating searching and over-compensation in prior art engine/generator sets under about ¼ rated laod.

Thus far a conventional governor system in cooperation with a conventional engine/generator set has been described. In the absence of a damping mechanism to limit responsiveness to engine speed changes, generally the governor system would cause overcompensation for changes in engine speed and also hunting or searching. This will be understood by reference to FIGS. 5 and 6 as follows:

FIG. 5 generally represents a strip chart illustrating adjustment of a conventional engine/generator set, by a conventional governor, in response to a load change placed upon the generator. The chart of FIG. 5 would appear generally the same for any system in which about one-fourth of the rated load were placed upon the generator. For example, if, for FIG. 5, a generator having a rated load of about 6 kw were placed, suddenly, under a load of about 1.5 kw, conventional engine speed changes, from governor adjustments are approximately as indicated. That is, if the engine were set to operate at a speed of about 1800 rpm under no load, as soon as the one-quarter of rated load were placed upon the generator, the engine speed, in response to the drag, reduces to a speed of about 1620 rpm, within the first several seconds. A conventional governor mechanism, in response to this drop in speed, causes rotation or pivoting of the governor arm, movement of the governor rod and thus rotation of the throttle plate, to adjust the throttle and increase engine speed. Generally, for conventional systems, this operates in an over-compensation, for the example shown in FIG. 5 an increase in engine speed to about 1860 rpm. The main governor spring then causes an over-compensation to slow down the engine, for the example shown in FIG. 5 the slowing of the engine being to about 1680 rpm after about three seconds. As is understood by reference to FIG. 5, generally this hunting or searching continues, with engine surges and reductions in speed, through a total of about eight alternating minima and maxima, until the engine speed is finally returned to about the desired level. It will be understood that a similar, but opposite, searching will result if the load is taken off of the generator. That is, there will first be an initial surge in engine speed, followed by overcompensation to reduce engine speed, etc.

Figure 6:
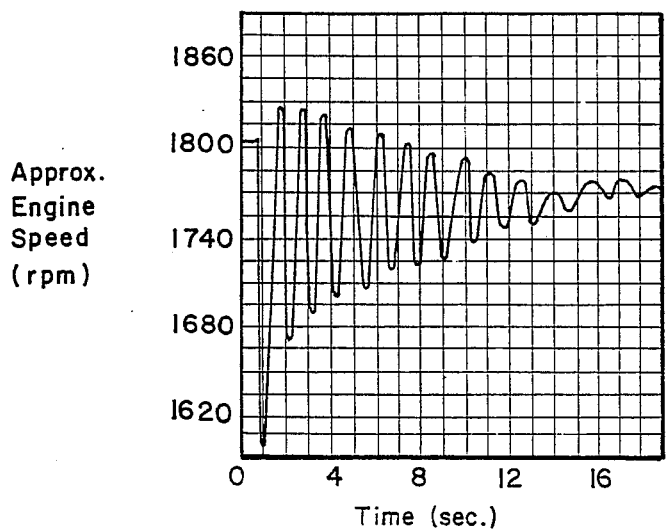
FIG. 6 is a strip chart illustrating governor over-compensation and searching in prior art engine/generator sets under ½ rated load.

FIG. 6 also represents a strip chart for a prior art system, this time wherein a load of about one-half of a rated load has been placed on the system. It will be understood from reference to FIG. 6 that the greater load generally causes a faster and more pronounced engine speed reduction, with faster and more frequent adjustments. Further, generally more maxima and minima are passed through before engine speed is returned to a desired level.

Through operation of the damper mechanism according to the present invention, a method is provided whereby less searching will result, i.e. there will be fewer maxima and minima, generally, as the governor system compensates for power drains or reductions; and engine speed will generally be brought to a desired level within a shorter period of time. This results from the damper mechanism providing a controlled, reproducible, amount of resistance to governor movement. The damper mechanism is generally understood by reference to FIGS. 2, 3 and 4.

Referring to FIG. 4, the governor arm 10 includes an extension or eddy-current plate 55 thereon. The preferred plate 55, in FIG. 4, is integral with arm 10 and comprises a triangularly shaped extension of steel 60. It will be understood that a conventional governor mechanism may be modified to include an eddy-plate 55 by a variety of methods in accord with the principles of the present invention. For example, the plate may be attached to an existing governor member, or an existing governor member can be removed and replaced by a member having a plate mounted thereon. Triangular plate 60, FIG. 4, includes a central aperture 61 therein, although such is not necessary for operation of the system. It will be understood by reference to FIG. 4 that as the governor arm 10 is pivoted in the general direction of double-headed arrows 65, plate 55 will move in the directions of double-headed arrow 66, with some upward curving. Plate 55 may be constructed from a variety of conductive materials, well-known, in which eddy-currents can be readily generated.

Figure 2:
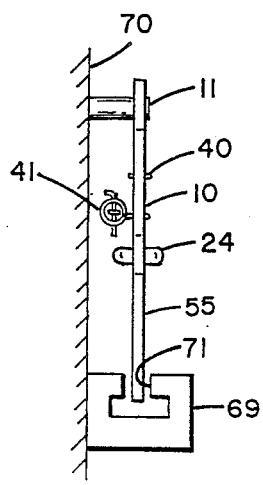
FIG. 2 is an enlarged, fragmentary, side elevational view of a portion of the system shown in FIG. 1, taken generally from the point of view of line 2—2.

Referring to FIG. 2, plate 55 is aligned with a magnet 69, mounted upon a side 70 of the engine/generator set 1. Magnet 69 may be mounted by a variety of conventional means, not shown in detail.

Magnet 69 includes a gap 71 therein, through which plate 55 passes during pivoting of governor arm 10. Magnet 69 may be a conventional industrial C-shaped magnet, providing a magnetic field which, as plate 55 moves therethrough, will set up an eddy-current in conductive material from which plate 55 is formed. As a result of the eddy-current generation, through the magnetic field, resistance to pivoting of arm 10 about the axis defined by axle 11 results. That is, pivoting of arm 10 is more difficult in the presence of aligned field 69, than in its absence. In either case pivoting readily occurs. However, in the presence of the magnetic field generated by magnet 69 a damping or resistance to governor member movement is created. As a result of this, an eddy-current damper is provided to cause resistance in governor compensation for changes in engine speeds. Over-compensation will be less likely to occur and less searching or hunting results. The advantages result, in part, from the introduction of a predictable and reproducible sluggishness, i.e. resistance, into governor member movement.

It will be understood that a variety of sizes of magnets and components may be utilized to cause controlled damping in a variety of embodiments. For a typical engine/generator set utilizing an engine of about 10-12 horsepower, typically an eddy-current plate 55 having a width, i.e. distance D, FIG. 4, of between about 1 and 3 inches, and preferably about 1.75 inches, will be sufficient, with the thickness of the metal of plate 55 being between about 0.025 and about 0.2 inches, and preferably about 0.1 inch. The total overall governor arm length for a typical such system is about eight inches. A preferred magnet strength, for generating a preferred amount of resistance through eddy-current generation, is about grade 16, i.e. about 8200 gauss, and is generally between about 7000 and 9000 gauss. The air gap in the C-magnet, through which plate 55 longitudinally moves, should preferably be between about 0.4 and about 0.5 inches, preferably with a distance between the plate 55 and the magnet being between about 0.175 and 0.2 inches. The magnet, for such a system, is preferably about ⅜ inches by ⅜ inches and weighs about 0.0123 pounds. Laminar magnet arrangements may be utilized, if desired.

The preferred embodiment has been described having the eddy-current plate mounted on, and integral with, the governor arm. It will be understood that the principles of the present invention may be applied to an eddy-current plate mounted on a variety of governor members, such as the governor arm, which move in response to changes in speed of the associated engine. All that is generally required is the positioning of an eddy-current plate on a governor member whose movement is to be dampened, and the orienting of a magnetic field appropriately to generate the eddy-current and resistance to movement.

It is to be understood that while certain embodiments of the present invention have been illustrated and described, it is not to be limited to the specific forms or arrangement of parts herein described and shown.

What is claimed and desired to be secured by Letters Patent is as follows:

1. A method of damping a governor mechanism of an engine subject to load variations; said method including a step of positioning an eddy-current damper in operative association with the governor mechanism to inhibit searching and over-compensation;
   (a) said governor mechanism including a governor member and a link mechanism constructed and arranged to translate motion of the governor member to throttle plate adjustment; said engine having a side portion;
   (b) said method including a step of providing an eddy-current plate on a first of said governor member and said engine side portion; and
   (c) said method including a step of providing a magnet on a second of said engine side portion and said governor member, said magnet being oriented to generate an eddy-current in said eddy-current plate in response to movement of said governor member.

2. A method of damping a governor mechanism of an engine subject to load variations, to inhibit overcompensation and searching; the governor mechanism including a governor member and a link mechanism constructed and arranged to translate motion of the governor member into engine speed adjustment; said method including the steps of:
   (a) providing an eddy-current plate on said governor member and
   (b) providing a magnet oriented to generate an eddy-current in said eddy-current plate in response to movement of said governor member;
   (c) whereby a magnetic field generated by said magnet generates resistance to movement of said governor member and thereby dampens governor mechanism adjustment of the engine speed.

3. The method according to claim 2 wherein:
   (a) said magnet is a C-magnet having a gap therein; and
   (b) said magnet is oriented to permit said eddy-current plate to move through said C-magnet gap during governor member movement.

4. The method according to claim 3 wherein said magnet has a strength of 7000-9000 gauss.

5. The method according to claim 4 wherein said magnet gap is 0.4-0.5 inches.

6. A damper mechanism for an engine governor mechanism having a governor member; said damper mechanism including:
   (a) an eddy-current plate on said governor member; and,
   (b) a magnet constructed and arranged to generate an eddy-current in said eddy-current plate in response to movement of said governor member;
   (c) whereby movement of said governor member to generate adjustment in engine speed is dampened, to inhibit over-compensation and searching.

7. The damper mechanism according to claim 6 wherein:
   (a) said magnet is a C-magnet having a gap therein; and,
   (b) said C-magnet is oriented for passage of said eddy-current plate through said magnet gap during governor member movement.

8. The damper mechanism according to claim 7 wherein said magnet has a strength of 7000 to 9000 gauss.

9. The damper mechanism according to claim 7 wherein said magnet gap is between 0.4 and 0.5 inches.

10. A damper mechanism for an engine governor mechanism including a governor member which pivots in response to changes in engine speed to adjust engine speed; said damper mechanism comprising:
    (a) an eddy-current plate mounted on said governor member; and (b) a magnet constructed and arranged to generate an eddy-current in said eddy-current plate in response to movement of said governor member;

(c) whereby movement of said governor member to generate adjustment in engine speed is dampened, to inhibit over-compensation and searching.

11. The damper mechanism according to claim 10 wherein:

(a) said magnet is a C-magnet having a gap therein; and, (b) said C-magnet is oriented for passage of said eddy-current plate through said magnet gap during governor member movement.

12. The damper mechanism according to claim 11 wherein said magnet has a strength of 7000 to 9000 gauss.

13. The damper mechanism according to claim 11 wherein said magnet gap is between 0.4 and 0.5 inches.

* * * * *